US011327003B2

(12) United States Patent
Lin et al.

(10) Patent No.: US 11,327,003 B2
(45) Date of Patent: May 10, 2022

(54) CHARACTERIZATION AND SORTING FOR PARTICLE ANALYZERS

(71) Applicant: BECTON, DICKINSON AND COMPANY, Franklin Lakes, NJ (US)

(72) Inventors: Jonathan Lin, San Jose, CA (US); Joseph Trotter, La Jolla, CA (US); Keegan Owsley, Santa Clara, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 241 days.

(21) Appl. No.: 16/557,539

(22) Filed: Aug. 30, 2019

(65) Prior Publication Data

US 2020/0072727 A1 Mar. 5, 2020

Related U.S. Application Data

(60) Provisional application No. 62/724,834, filed on Aug. 30, 2018.

(51) Int. Cl.
*G01N 15/00* (2006.01)
*G01N 15/14* (2006.01)
(Continued)

(52) U.S. Cl.
CPC ..... *G01N 15/1429* (2013.01); *G01N 15/1404* (2013.01); *G01N 15/1434* (2013.01);
(Continued)

(58) Field of Classification Search
CPC ............................... C12M 41/00; C12M 41/36
See application file for complete search history.

(56) References Cited

U.S. PATENT DOCUMENTS

| 6,615,141 B1 * | 9/2003 | Sabry ..................... G06V 20/69 435/6.13 |
| 7,920,736 B2 * | 4/2011 | Sammak .................. G06T 7/41 382/133 |

(Continued)

OTHER PUBLICATIONS

Lee, G. (2011). Machine learning for flow cytometry data analysis (Order No. 3492954). Available from ProQuest Dissertations and Theses Professional. (919730311). (Year: 2011).*

(Continued)

*Primary Examiner* — Gurkanwaljit Singh
(74) *Attorney, Agent, or Firm* — Bret E. Field; Bozicevic, Field & Francis LLP

(57) ABSTRACT

Non-parametric transforms such as t-distributed stochastic neighbor embedding (tSNE) are used to analyze multi-parametric data such as data derived from flow cytometry or other particle analysis systems and methods. These transforms may be included for dimensionality reduction and identification of subpopulations (e.g., gating). By nature, non-parametric transforms cannot transform new observations without training a new transformation based on the entire dataset including the new observations. The features described parameterize non-parametric transforms using a neural network thereby allowing a small training dataset to be transformed using non-parametric techniques. The training dataset may then be used to generate an accurate parametric model for assessing additional events in a manner consistent with the initial events.

21 Claims, 7 Drawing Sheets

(51) Int. Cl.
*G06N 7/06* (2006.01)
*G06N 20/00* (2019.01)
*G06F 16/20* (2019.01)
*G06F 16/28* (2019.01)
*G06N 3/08* (2006.01)

(52) U.S. Cl.
CPC ......... *G01N 15/1459* (2013.01); *G06F 16/20* (2019.01); *G06F 16/28* (2019.01); *G06N 3/08* (2013.01); *G06N 7/06* (2013.01); *G06N 20/00* (2019.01); *G01N 2015/0065* (2013.01); *G01N 2015/1402* (2013.01)

(56) References Cited

U.S. PATENT DOCUMENTS

| | | | |
|---|---|---|---|
| 9,164,022 B2 | 10/2015 | Zhu et al. | |
| 9,551,645 B2* | 1/2017 | Vacca | G01N 15/1459 |
| 9,778,193 B2 | 10/2017 | Vacca | |
| 9,990,687 B1* | 6/2018 | Kaufhold | G06V 10/82 |
| 10,266,893 B2* | 4/2019 | Rabinowitz | G16B 20/20 |
| 2015/0192511 A1 | 7/2015 | Wagner et al. | |
| 2016/0011096 A1* | 1/2016 | Vacca | G01N 15/1436 356/442 |
| 2017/0052159 A1 | 2/2017 | Harant et al. | |
| 2018/0038784 A1 | 2/2018 | Marks et al. | |
| 2019/0284268 A1* | 9/2019 | Nilsson | A61K 39/0005 |
| 2020/0362334 A1* | 11/2020 | Regev | C12N 15/1096 |

OTHER PUBLICATIONS

Caicedo, J., Cooper, S., Heigwer, F. et al. Data-analysis strategies for image-based cell profiling. Nat Methods 14, 849-863 (2017). https://doi.org/10.1038/nmeth.4397 (Year: 2017).*

Zamparo, L. (2015). Analyzing phenotypes in high-content screening with machine learning (Order No. 10020585). Available from ProQuest Dissertations and Theses Professional. (1771327482). Retrieved from https://dialog.proquest.com/professional/docview/1771327482?accountid=131444 (Year: 2015).*

Matos, Tiago R., Hongye Liu, and Jerome Ritz. "Research techniques made simple: mass cytometry analysis tools for decrypting the complexity of biological systems." Journal of Investigative Dermatology 137.5 (2017): e43-e51. (Year: 2017).*

Chester, Cariad, and Holden T. Maecker. "Algorithmic tools for mining high-dimensional cytometry data." The Journal of Immunology 195.3 (2015): 773-779. (Year: 2015).*

* cited by examiner

CHARACTERIZATION AND SORTING FOR PARTICLE ANALYZERS

CROSS-REFERENCE TO RELATED APPLICATIONS

Pursuant to 35 U.S.C. § 119(e), this application claims priority to the filing date of U.S. Provisional Patent Application Ser. No. 62/724,834 filed on Aug. 30, 2018, the disclosure of which application is herein incorporated by reference.

TECHNICAL FIELD

This disclosure relates to relates generally to the field of automated particle assessment, and more particularly to sample analysis and particle characterization methods.

BACKGROUND

Particle analyzers, such as flow and scanning cytometers, are analytical tools that enable the characterization of particles on the basis of electro-optical measurements such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of photodetectors, one for each of the scatter parameters to be measured, and one or more for each of the distinct dyes to be detected are included in the analyzer. For example, some embodiments include spectral configurations where more than one sensor or detector is used per dye. The data obtained comprise the signals measured for each of the light scatter detectors and the fluorescence emissions.

Particle analyzers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured features. The use of standard file formats, such as an "FCS" file format, for storing data from a particle analyzer facilitates analyzing data using separate programs and/or machines. Using current analysis methods, the data typically are displayed in 1-dimensional histograms or 2-dimensional (2D) plots for ease of visualization, but other methods may be used to visualize multidimensional data.

The parameters measured using, for example, a flow cytometer typically include light at the excitation wavelength scattered by the particle in a narrow angle along a mostly forward direction, referred to as forward scatter (FSC), the excitation light that is scattered by the particle in an orthogonal direction to the excitation laser, referred to as side scatter (SSC), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, wherein each cell corresponds to a point in a multi-dimensional space defined by the parameters measured. Populations of cells or particles are identified as clusters of points in the data space. The identification of clusters and, thereby, populations can be carried out manually by drawing a gate around a population displayed in one or more 2-dimensional plots, referred to as "scatter plots" or "dot plots," of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; and 6,944,338; and U.S. Pat. Pub. No. 2012/0245889, each incorporated herein by reference.

Flow cytometry is a valuable method for the analysis and isolation of biological particles such as cells and constituent molecules. As such it has a wide range of diagnostic and therapeutic applications. The method utilizes a fluid stream to linearly segregate particles such that they can pass, single file, through a detection apparatus. Individual cells can be distinguished according to their location in the fluid stream and the presence of detectable markers. Thus, a flow cytometer can be used to characterize and produce a diagnostic profile of a population of biological particles.

Isolation of biological particles has been achieved by adding a sorting or collection capability to flow cytometers. Particles in a segregated stream, detected as having one or more desired characteristics, are individually isolated from the sample stream by mechanical or electrical separation. This method of flow sorting has been used to sort cells of different types, to separate sperm bearing X and Y chromosomes for animal breeding, to sort chromosomes for genetic analysis, and to isolate particular organisms from complex biological population.

Gating is used to classify and help make sense of the large quantity of data that may be generated from a sample. Given the large quantities of data presented for a given sample, there exists a need to efficiently control the graphical display of the data.

Fluorescence-activated particle sorting or cell sorting is a specialized type of flow cytometry. It provides a method for sorting a heterogeneous mixture of particles into one or more containers, one cell at a time, based upon the specific light scattering and fluorescent characteristics of each cell. It records fluorescent signals from individual cells, and physically separates cells of particular interest. The acronym FACS is trademarked and owned by Becton Dickinson and may be used to refer to devices for performing fluorescence-activated particle sorting or cell sorting.

The particle suspension is placed near the center of a narrow, rapidly flowing stream of liquid. The flow is arranged so that on the average there is a large separation between particles relative to their diameter as they arrive stochastically (Poisson process) into the detection region. A vibrating mechanism causes the emerging fluid stream to break off in a stable manner into individual droplets that contain particles previously characterized in the detection region. The system is generally adjusted so that there is a low probability of more than one particle being in a droplet. If a particle is classified to be collected, a charge is applied to the flow cell and emerging stream during the period of time one or more drops form and break off from the stream. These charged droplets then move through an electrostatic deflection system that diverts droplets into target containers based upon the charge applied to the droplet.

A sample can include thousands if not millions of cells. Cells may be sorted to purify a sample to the cells of interest. The sorting process can generally identify three varieties of cells: cells of interest, cells which are not of interest, and cells which cannot be identified. In order to sort cells with high purity (e.g., high concentration of cells of interest), droplet generating cell sorters typically abort the sort electronically if the desired cells are too close to another unwanted cell and thereby reduce contamination of the sorted populations by any inadvertent inclusion of an unwanted particle within the droplet containing the particle of interest.

SUMMARY

In one innovative aspect, a computer-implemented method performed under control of one or more processing devices is provided. The method includes receiving, from a particle analyzer, measurements for a first portion of particles associated with an experiment. The method includes converting the measurements using a non-parametric transformation into initial transformed measurements. The method includes generating a parametric model to receive, as an input, the measurements for the first portion of particles associated with the experiment and generate, as an output, the initial transformed measurements. The method also include configuring the particle analyzer. The particle analyzer is configured to convert a measurement for a particle included in a second portion of the particles based at least in part on the parametric model and classify the particle based at least in part on the measurement and a sorting criterion.

Some implementations of the method include receiving gate information identifying a range of measurements in non-parametric space for classifying the particle, wherein the sorting criterion comprises the gate information.

Some implementations of the method include transmitting the parametric model to the particle analyzer and causing the particle analyzer to configure sorting circuitry based at least in part on the parametric model and the sorting criterion. For example, the sorting circuitry may be implemented as a field programmable gate array.

The measurements received from the particle analyzer may include measurements of light emitted fluorescently by the first portion of particles. The light emitted fluorescently by the first portion of particles may include light emitted fluorescently by antibodies bound to the first portion of particles.

Some implementations of the method may include selecting a measurement and initial transformed measurement for a particle and generating synthetic measurement pair based at least in part on: (i) the measurement for the particle, (ii) an initial transformed measurement for the particle, and (iii) a noise value, wherein the synthetic measurement pair includes a synthetic measurement and a synthetic transformed measurement. The parametric model may further receive, as an input, the synthetic measurement and generates, as an output, the synthetic transformed measurement.

In some implementations, the method may also include receiving gate information identifying a range of measurements for classifying the particle. For example, the particle may be selected based at least in part on the measurement corresponding to the range of measurements.

Some implementations of the method may include receiving, from the particle analyzer, a hardware identifier indicating sorting circuitry implemented in the particle analyzer and determining an architecture for the parametric model based at least in part on the hardware identifier, wherein the architecture for the parametric model can be applied to the sorting circuitry. In such implementations, generating the parametric model may include generating the parametric model conforming to the architecture. For example, the parametric model may include a neural network, and the architecture identifies a number of layers for the neural network and a number of nodes per layer.

In implementations where the parametric model includes a neural network, generating the parametric model may include assigning an initial weight to a connection between a first node in a first layer of the parametric model and a second node of a second layer of the parametric model of a second layer; generating an output for a measurement for a particle; comparing the output to the transformed measurement for the particle; and adjusting the initial weight based at least in part on a difference between the output and the transformed measurement, wherein a subsequent difference for the particle, after adjusting the initial weight, is less than the difference.

In another innovative aspect, a system including one or more processing devices and a computer-readable storage medium comprising instructions is provided. The instructions, when executed by the one or more processing devices, causes the system to, receive, from a particle analyzer, measurements for a first portion of particles associated with an experiment; convert the measurements using a non-parametric transformation into initial transformed measurements; generate a parametric model to receive as an input raw measurements for the first portion of particles associated with the experiment and generate as an output thee initial transformed measurements; and configure the particle analyzer. The particle analyzer is be configured to convert a measurement for a particle included in a second portion of the particles based at least in part on the parametric model; generate a control signal to adjust an operational state for an analytical means included in the particle analyzer; and transmit the control signal to the analytical means to achieve the operational state.

In some implementations, the analytical means may include sorting electronics communicatively coupled to a deflection plate. The particle analyzer may be further configured to identify a target vessel for a particle based at least in part on the converted measurement corresponding a sort criterion associated with the target vessel. Adjusting the operational state may include application of a charge via the deflector plate to direct the particle into a target vessel. In some implementations, the analytical means may include a fluidics system, and adjusting the operational state includes regulating a pressure applied during the experiment.

DETAILED DESCRIPTION

Figure 1:
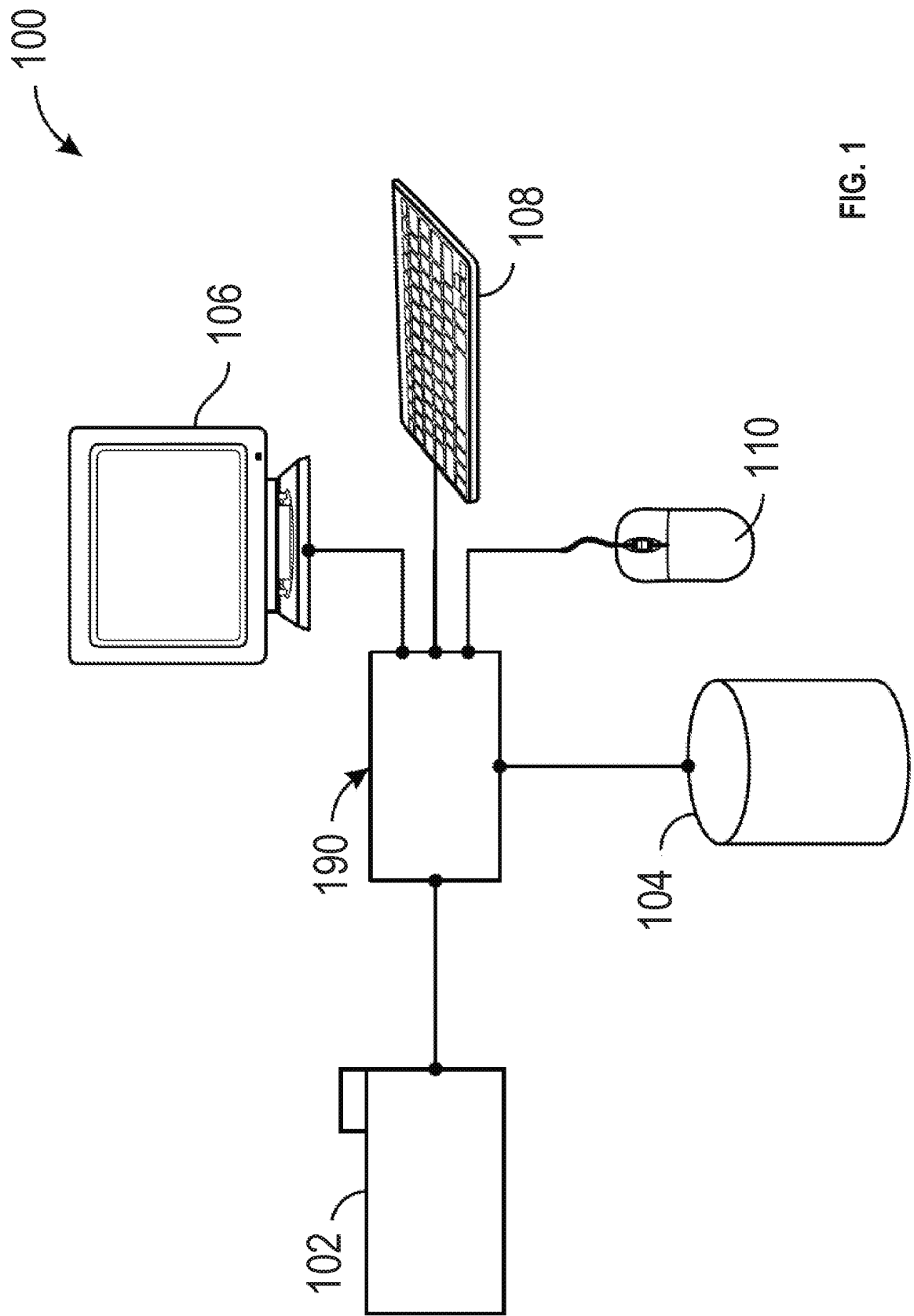
FIG. 1 shows a functional block diagram for one example of a transformation control system for analyzing and displaying biological events.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Non-parametric transforms such as t-distributed stochastic neighbor embedding (tSNE) are used to analyze multiparametric data such as data derived from flow cytometry or other particle analysis systems and methods. These transforms may be included for dimensionality reduction and identification of subpopulations (e.g., gating). By nature, non-parametric transforms cannot transform new observations without training a new transformation based on the entire dataset including the new observations. This presents substantial challenges to computational based particle analysis and processing of samples based on such analysis (e.g., sorting, instrument control, etc.). The features described parameterize non-parametric transforms using a neural network (e.g., artificial neural network or other computational model trained to approximate the non-parametric transformation) thereby allowing a small training dataset to be transformed using non-parametric techniques and used to generate an accurate parametric model for assessing additional events in a manner consistent with the initial events.

In some implementations a small training dataset (e.g., tens of thousands of examples) is transformed using a nonparametric transformation such as tSNE. A large training dataset may be synthesized from the small training dataset.

For example, by randomly drawing transformed/untransformed pairs from the small training dataset and adding random noise to both the transformed and untransformed data. The random drawing can be arbitrarily weighted such as by density, by populations of interest, or with a uniform weight. The added noise can be based on a probability distribution including uniform, Gaussian, or Poisson.

The resulting large training dataset is used to train a neural network to perform the transform produced by the nonparametric transform that was performed on the small training dataset. The neural network can possess a wide variety of architectures with any number of layers, any number of neurons in a layer and any activation function between connected neurons. However, to facilitate translation of the neural network to a configuration for the sorting electronics included in an analytical instrument, the network training may be constrained to an architecture that can be translated to the target analytical instrument. For instance, the neural network can consist of an entry layer with a number of nodes equivalent to the dimensionality of the untransformed data, four fully connected, rectified linear unit (re-lu) activated layers with 30 nodes each, and an output layer of two nodes with linear activation. Training can be performed using a wide variety of error functions (e.g. mean squared error, Kullback-Leibler divergence) and optimizers (e.g. Adadelta, RMSProp).

After training, the neural network approximates the transformation that was originally used to transform the small training dataset. Thus, the neural network represents a transformation between the space occupied by the original, untransformed data and the space occupied by the transformed data. The neural network can therefore be used to transform new observations by feeding new data to the entry layer and collecting the resulting transformed data from the output layer. The output data can then be used for downstream applications such as cell sorting decisions.

The features described provide significant improvements over existing particle analysis systems such as those including non-parametric transformations. Non-parametric transforms are commonly used to analyze multi-parametric data such as flow cytometry data. For instance, tSNE is used to perform dimensionality reduction on flow cytometry data in order to visualize cellular subpopulations. A fundamental limitation of non-parametric transforms is that, once trained, they cannot be used to transform new observations. Thus, introduction of new data requires the entire transformation to be re-performed, often resulting in a transform that is radically different. As a result, nonparametric transforms have limited utility in fields that require analysis of new observations such as FACS. The features described overcome these limitations with non-parametric transforms.

Other approaches to parameterizing non-parametric transforms rely on large training sets (e.g., approximately 100,000 or more data points). The technique described here uses a small training set that can be used to synthesize a representative dataset of sufficient size to train a machine learning model that produces accurate results using parameterized transformation. This saves time and material for the user and is more compatible with the sample sizes that are common when assessing biological samples. For instance, a typical flow cytometry setup experiment typically consists of tens of thousands of data points. These data points may be too few in number for training an accurate neural network. Requiring a user to collect hundreds of thousands to millions of data points would be time consuming and require a large amount of sample which is often expensive and difficult to acquire.

Still other approaches to parameterizing nonparametric transforms rely on large, complicated neural networks with many layers and many nodes. These large networks are computationally expensive to evaluate and thus cannot be implemented with a computational time short enough for low latency applications such as cell sorting on sorting electronics which may have limited processing resources. The technique described here utilizes a relatively small number of layers and nodes such that low latency implementation can be achieved on resource efficient sorting electronics such as a field programmable gate array (FPGA).

In the context of flow sorting, the features described allow collection of a small dataset akin to the dataset that is currently being used to establish the gating strategy for a sort. A non-parametric transformation can then be performed on the small dataset. For instance, tSNE can be performed to reduce the dimensionality of the data. The system may then receive gates specified using the tSNE transformed data. The pre- and post-tSNE data may then be used to train a neural network that learns the transformation between the original data space and the dimensionality reduced space. The trained neural network can then be programmed into an FPGA and used to sort cells (or other particles) for the actual sort experiment. In previously implementations, it has not been possible to sort based data that is transformed using a non-parametric transform.

In some embodiments, the transformation model includes a dynamic algorithm such as a machine learning algorithm. The term "machine learning" is used herein in its conventional sense to refer to adjustments to programming by computational methods that ascertain and implement information directly from data without relying on a predetermined equation as a model. In certain embodiments, machine learning includes learning algorithms which find patterns in data signals (e.g., from a plurality of particles in a flow cytometry sample). In these embodiments, the learning algorithm is configured to generate better and more accurate decisions and predictions as a function of the number of data signals (i.e., the learning algorithm becomes more robust as the number of characterized particles from the sample increases). Machine-learning protocols of interest may include, but are not limited to artificial neural networks, decision tree learning, decision tree predictive modeling, support vector machines, Bayesian networks, dynamic Bayesian networks, genetic algorithms among other machine learning protocols.

Neural networks or neural network models can be conceptualized as networks of nodes. The nodes may be organized into layers where the first layer is an input layer that data flows into. The neural network may also include an output layer where transformed data flows out. Each individual node may have multiple inputs and a single output (e.g., input layer nodes only have a single input). The output of a node represents a linear combination of the inputs. In other words, inputs may be multiplied by an associated constant. The products may be accumulated along a path of nodes with a constant offset. The constant offset, or "bias", may represent another degree of freedom that can be adjusted during the training process. For example, in the context of neural network models based on re-lu, the constant offset may be a threshold since it has the ability to reduce a node value below zero, causing the activation function to output zero.

The resulting value is evaluated using an activation function and the resulting value is used as the output of the node. The nodes in a given layer within the neural network are connected to each node of an adjacent layer. Neural networks may be trained by minimizing the error of the network using gradient descent algorithm and an error function to compare the desired output of the network and the networks actual output. The weighting for one or more nodes may be adjusted to model a desired result produced by the network.

Typically, neural networks require large amounts of data for training. Here, training with a small dataset is made possible by bootstrapping (generating synthetic data based on the small dataset). The term "bootstrapping" is used herein in its conventional sense to refer to the generation one or more additional data sets having a greater amount of data than an original data set, such as generating a data set having 10 data points or more greater than the original data set, such as 100 data points or more, such as 1000 data points or more, such as 10000 data points or more, such as 100,000 data points or more and including 1,000,000 data points or more. In some instances, the generated data set includes an increase in data points by 2-fold or more as compared to the original data set, such as 3-fold or more, such as 5-fold or more, such as 10-fold or more, such as 25-fold or more, such as 50-fold or more, such as 100-fold or more and including 1000-fold or more. In certain embodiments, bootstrapping includes random sampling with replacement. In certain embodiment, bootstrapping includes estimating properties of an estimator (e.g., by variance) by measuring properties when sampling from an approximating distribution (e.g., an empirical distribution function) Bootstrapping according to certain embodiments may include the use of data from the flow cytometer in combination with noise components generated by the flow cytometer, such as by vibrations from the laser components or detection systems as well as noise from the photodetectors.

Careful selection of neural network architecture such that the number of nodes per layer and the number of layers is minimized allows for implementation of the neural network in computational hardware such as an FPGA. Additionally the selection of a FPGA-compatible activation function further enables hardware implementation of the network. Implementation in hardware is crucial to transforming the data with latency that is sufficiently low for cell sorting applications.

As used herein, the terms set forth with particularity below have the following definitions. If not otherwise defined in this section, all terms used herein have the meaning commonly understood by a person skilled in the arts to which this invention belongs.

As used herein, "system," "instrument," "apparatus," and "device" generally encompass both the hardware (e.g., mechanical and electronic) and, in some implementations, associated software (e.g., specialized computer programs for graphics control) components.

As used herein, an "event" or "event data" generally refers to the packet of data measured from a single particle, such as cells or synthetic particles. Typically, the data measured from a single particle include a number of parameters, including one or more light scattering parameters, and at least one parameter or feature derived from fluorescence detected from the particle such as the intensity of the fluorescence. Thus, each event is represented as a vector of measurements and features, wherein each measured parameter or feature corresponds to one dimension of the data space. In some embodiments, the data measured from a single particle include image, electric, temporal, or acoustic data. An event may be associated with an experiment, an assay, or a sample source which may be identified in association with the measurement data.

As used herein, a "population", or "subpopulation" of particles, such as cells or other particles, generally refers to a group of particles that possess properties (for example, optical, impedance, or temporal properties) with respect to one or more measured parameters such that measured parameter data form a cluster in the data space. Thus, populations are recognized as clusters in the data. Conversely, each data cluster generally is interpreted as corresponding to a population of a particular type of cell or particle, although clusters that correspond to noise or background typically also are observed. A cluster may be defined in a subset of the dimensions, e.g., with respect to a subset of the measured parameters, which corresponds to populations that differ in only a subset of the measured parameters or features extracted from the measurements of the cell or particle.

As used herein, a "gate" generally refers to a classifier boundary identifying a subset of data of interest. In cytometry, a gate may bound a group of events of particular interest. As used herein, "gating" generally refers to the process of classifying the data using a defined gate for a given set of data, where the gate may be one or more regions of interest combined with Boolean logic.

As used herein, an "event" generally refers to the assembled packet of data measured from a single particle, such as cells or synthetic particles). Typically, the data measured from a single particle include a number of parameters or features, including one or more light scattering parameters or features, and at least one other parameter or feature derived from measured fluorescence. Thus, each event is represented as a vector of parameter and feature measurements, wherein each measured parameter or feature corresponds to one dimension of the data space.

Aspects of the present disclosure also include systems having a light detection system for characterizing particles of a sample in a flow stream (e.g., cells in a biological sample). Systems according to certain embodiments include a light source configured to irradiate a sample having particles in a flow stream; a light detection system comprising a photodetector configured to generate data signals from light detected from the particles in the flow stream; and a processor with memory operably coupled to the processor where the memory has instructions stored thereon, which when executed by the processor, cause the processor to: apply a non-parametric transformation to a first set of data signals from the light detection system to generate a first transformed data set; generate a second transformed data set from the first transformed data set; generate a transformation model using the second transformed data set; and apply the transformation model to a second set of data signals from the light detection system.

Systems of interest include a light source configured to irradiate a sample in a flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having one or more of a brightfield photodetector, a light scatter (forward light scatter, side light scatter) detector and a fluorescence detector for detecting and measuring light from the sample. The subject brightfield, light scatter and fluorescence detectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the brightfield photodetector includes an avalanche photodiode (APD). In some instances, the light scatter detector is an avalanche photodiode. In certain instances, one or more of the fluorescence detectors are avalanche photodiodes.

In some embodiments, light detection systems of interest include a plurality of fluorescence detectors. In some instances, the light detection system includes a plurality of solid-state detectors such as photodiodes. In certain instances, the light detection system includes a fluorescence photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodetector (e.g., photodiode) in the array ranges from 25 to μm$^2$ to 10000 μm$^2$, such as from 50 to μm$^2$ to 9000 μm$^2$, such as from 75 to μm$^2$ to 8000 μm$^2$, such as from 100 to μm$^2$ to 7000 μm$^2$, such as from 150 μm$^2$ to 6000 μm$^2$ and including from 200 μm$^2$ to 5000 μm$^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm2 to 10000 mm2, such as from 0.5 mm2 to 5000 mm2, such as from 1 mm2 to 1000 mm2, such as from 5 mm2 to 500 mm2, and including from 10 mm2 to 100 mm2.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, light detection systems include a brightfield photodetector configured to generate a brightfield data signal. The brightfield photodetector may be configured to detect light from the sample at one or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including detecting light at 400 or more different wavelengths. The brightfield photodetector may be configured to detect light over one or more of the wavelength ranges of 200 nm-1200 nm. In some instances, methods include detecting light from the sample with the brightfield photodetector over a range of wavelengths, such as from 200 nm to 1200 nm, such as from 300 nm to 1100 nm, such as from 400 nm to 1000 nm, such as from 500 nm to 900 nm and including from 600 nm to 800 nm.

The brightfield photodetector in light detection systems of interest is, in certain embodiments, configured to generate one or more brightfield data signals in response to the detected light, such as 2 or more, such as 3 or more, such as 4 or more, such as 5 or more and including 10 or more brightfield data signals in response to the detected light. Where the brightfield photodetector is configured to detect light over a plurality of wavelengths of light (e.g., from 400 nm to 800 nm), methods in some instances may include generating one or more brightfield data signals in response to each wavelength of light detected. In other instances, a single brightfield data signal is generated in response to light detected by the brightfield photodetector across the entire range of wavelengths.

In some embodiments, light detection systems include a light scatter photodetector configured to generate a light scatter data signal. The light scatter photodetector may be configured to detect light from the sample at one or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including detecting light at 400 or more different wavelengths. The light scatter photodetector may be configured to detect light over one or more of the wavelength ranges of 200 nm-1200 nm. In some instances, methods include detecting light from the sample with the light scatter photodetector over a range of wavelengths, such as from 200 nm to 1200 nm, such as from 300 nm to 1100 nm, such as from 400 nm to 1000 nm, such as from 500 nm to 900 nm and including from 600 nm to 800 nm.

The light scatter photodetector in light detection systems of interest is, in certain embodiments, configured to generate one or more light scatter data signals in response to the detected light, such as 2 or more, such as 3 or more, such as 4 or more, such as 5 or more and including 10 or more light scatter data signals in response to the detected light. Where the light scatter photodetector is configured to detect light over a plurality of wavelengths of light (e.g., from 400 nm to 800 nm), methods in some instances may include generating one or more light scatter data signals in response to each wavelength of light detected. In other instances, a single light scatter data signal is generated in response to light detected by the light scatter photodetector across the entire range of wavelengths.

Light detection systems include one or more brightfield, light scatter or fluorescence detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more detectors. In embodiments, each of the detectors is configured to generate a data signal. Light from the sample may be detected by each detector, independently, over one or more of the wavelength ranges of 200 nm-1200 nm. In some instances, one or more detectors are configured to detect light from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, one or more detectors are configured to detect light at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different detectors in the subject light detection system. In certain embodiments, one or more detectors are configured to detect wavelengths of light which correspond to the fluorescence peak wavelength of certain fluorophores in the sample.

The light detection system is configured to measure light continuously or in discrete intervals. In some instances, the detectors of the light detection system are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, systems are configured to generate frequency-encoded fluorescence data by irradiating a sample having particles in a flow stream. In some embodiments, the light source includes a light generator component that generates a plurality of angularly deflected laser beams each having an intensity based on the amplitude of an applied radiofrequency drive signal (e.g., from a direct digital synthesizer coupled to an acousto-optic device). For example, the subject systems may include light generator component that generates 2 or more angularly deflected laser beams, such as 3 or more, such as 4 or more, such as 5 or more, such as 6 or more, such as 7 or more, such as 8 or more, such as 9 or more, such as 10 or more and including 25 or more angularly deflected laser beams. In embodiments, each of the angularly deflected laser beams have different frequencies which are shifted from frequency of the input laser beam by a predetermined radiofrequency.

The subject systems are, according to certain embodiments, configured to generate angularly deflected laser beam that are also spatially shifted from each other. Depending on the applied radiofrequency drive signals and desired irradiation profile of the output laser beam, the subject systems may be configured to generate angularly deflected laser beams that are separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In some embodiments, systems include a processor having memory operably coupled to the processor where the memory includes instructions stored thereon, which when executed by the processor, cause the processor to generate frequency-encoded fluorescence data by calculating a difference between the optical frequencies of the incident overlapping beamlets of light on the flow stream. In one example, systems include a processor having memory operably coupled to the processor where the memory includes instructions stored thereon, which when executed by the processor, cause the processor to calculate a beat frequency at each location across a horizontal axis of the flow stream. In these embodiments, the frequency-encoded fluorescence emitted by a particle is the beat frequency corresponding to the difference between the frequency of a local oscillator beam (fLO) and the frequency of a radiofrequency shifted beamlet. For example, the frequency-encoded fluorescence data includes a beat frequency of fLO-fRF shifted beamlet. Where irradiation of the flow stream includes a local oscillator which spans a width (e.g., the entire horizontal axis) of the flow stream, the frequency-encoded fluorescence data includes beat frequencies corresponding to the difference between the frequency of the local oscillator beam (fLO) and the frequency of each radiofrequency shifted beamlet (f1, f2, f3, f4, f5, f6, etc.). In these embodiments, the frequency-encoded fluorescence data may include a plurality of beat frequencies each corresponding to a location across the horizontal axis of the flow stream.

In some embodiments, the subject systems include a particle sorting component for sorting particles (e.g., cells) of the sample. In certain instances, the particle sorting component is a particle sorting module such as those described in U.S. Patent Publication No. 2017/0299493, filed on Mar. 28, 2017 and U.S. Provisional Patent Application No. 62/752,793 filed on Oct. 30, 2018, the disclosures of which is incorporated herein by reference. In certain embodiments, the particle sorting component include one or more droplet deflectors such as those described in U.S. Patent Publication No. 2018/0095022, filed on Jun. 14, 2017, the disclosure of which is incorporated herein by reference.

In some embodiments, the subject systems are flow cytometric systems. Suitable flow cytometry systems may include, but are not limited to those described in Ormerod (ed.), Flow Cytometry: A Practical Approach, Oxford Univ. Press (1997); Jaroszeski et al. (eds.), Flow Cytometry Protocols, Methods in Molecular Biology No. 91, Humana Press (1997); Practical Flow Cytometry, 3rd ed., Wiley-Liss (1995); Virgo, et al. (2012) Ann Clin Biochem. January; 49 (pt 1): 17-28; Linden, et. al., Semin Throm Hemost. 2004 October; 30(5):502-11; Alison, et al. J Pathol, 2010 December; 222(4):335-344; and Herbig, et al. (2007) Crit Rev Ther Drug Carrier Syst. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for characterizing and imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Specific examples of various embodiments and systems in which they are implemented are described further below.

FIG. 1 shows a functional block diagram for one example of a transformation control system for analyzing and displaying biological events. An analytics controller 190 may be configured to implement a variety of processes for controlling graphic display of biological events.

A particle analyzer 102 may be configured to acquire biological event data. For example, a flow cytometer may generate flow cytometric event data. The particle analyzer 102 may be configured to provide biological event data to the analytics controller 190. A data communication channel may be included between the particle analyzer 102 and the analytics controller 190. The biological event data may be provided to the analytics controller 190 via the data communication channel.

The analytics controller 190 may be configured to receive biological event data from the particle analyzer 102. The biological event data received from the particle analyzer 102 may include flow cytometric event data. The analytics controller 190 may be configured to provide a graphical display including a first plot of biological event data to a display device 106. The analytics controller 190 may be further configured to render a region of interest as a gate around a population of biological event data shown by the display device 106, overlaid upon the first plot. In some embodiments, the gate may be a logical combination of one or more graphical regions of interest drawn upon a single parameter histogram or bivariate plot.

The analytics controller 190 may be further configured to display the biological event data on the display device 106 within the gate differently from other events in the biological event data outside of the gate. For example, the analytics controller 190 may be configured to render the color of biological event data contained within the gate to be distinct from the color of biological event data outside of the gate. The display device 106 may be implemented as a monitor, a tablet computer, a smartphone, or other electronic device configured to present graphical interfaces.

The analytics controller 190 may be configured to receive a gate selection signal identifying the gate from a first input device. For example, the first input device may be implemented as a mouse 110. The mouse 110 may initiate a gate selection signal to the analytics controller 190 identifying the gate to be displayed on or manipulated via the display device 106 (e.g., by clicking on or in the desired gate when the cursor is positioned there). In some implementations, the first device may be implemented as the keyboard 108 or other means for providing an input signal to the analytics controller 190 such as a touchscreen, a stylus, an optical detector, or a voice recognition system. Some input devices may include multiple inputting functions. In such implementations, the inputting functions may each be considered an input device. For example, as shown in FIG. 1, the mouse 110 may include a right mouse button and a left mouse button, each of which may generate a triggering event.

The triggering event may cause the analytics controller 190 to alter the manner in which the data is displayed, which portions of the data is actually displayed on the display device 106, or provide input to further processing such as selection of a population of interest for particle sorting.

In some embodiments, the analytics controller 190 may be configured to detect when gate selection is initiated by the mouse 110. The analytics controller 190 may be further configured to automatically modify plot visualization to optimally facilitate the gating process. The modification may be based on the specific distribution of biological event data received by the analytics controller 190.

The analytics controller 190 may be connected to a storage device 104. The storage device 104 may be configured to receive and store biological event data from the analytics controller 190. The storage device 104 may also be configured to receive and store flow cytometric event data from the analytics controller 190. The storage device 104 may be further configured to allow retrieval of biological event data, such as flow cytometric event data, by the analytics controller 190.

A display device 106 may be configured to receive display data from the analytics controller 190. The display data may comprise plots of biological event data and gates outlining sections of the plots. The display device 106 may be further configured to alter the information presented according to input received from the analytics controller 190 in conjunction with input from the particle analyzer 102, the storage device 104, the keyboard 108, and/or the mouse 110.

A common flow sorting technique which may be referred to as "electrostatic cell sorting," utilizes droplet sorting in which a stream or moving fluid column containing linearly segregated particles is broken into drops and the drops containing particles of interest are electrically charged and deflected into a collection tube by passage through an electric field. Current drop sorting systems are capable of forming drops at a rate of 100,000 drops/second in a fluid stream that is passed through a nozzle having a diameter less than 100 micrometers. Droplet sorting typically requires that the drops break off from the stream at a fixed distance from the nozzle tip. The distance is normally on the order of a few millimeters from the nozzle tip and can be stabilized and maintained for an unperturbed fluid stream by oscillating the nozzle tip at a predefined frequency with an amplitude to hold the break-off constant. For example, in some embodiments, adjusting amplitude of a sine wave shaped voltage pulse at a given frequency holds the break-off stable and constant.

Typically, the linearly entrained particles in the stream are characterized as they pass through an observation point situated within a flow cell or cuvette, or just below the nozzle tip. Once a particle is identified as meeting one or more desired criteria, the time at which it will reach the drop break-off point and break from the stream in a drop can be predicted. Ideally, a brief charge is applied to the fluid stream just before the drop containing the selected particle breaks from the stream and then grounded immediately after the drop breaks off. The drop to be sorted maintains an electrical charge as it breaks off from the fluid stream, and all other drops are left uncharged. The charged drop is deflected sideways from the downward trajectory of the other drops by an electrical field and collected in a sample tube. The uncharged drops fall directly into a drain.

Figure 2A:
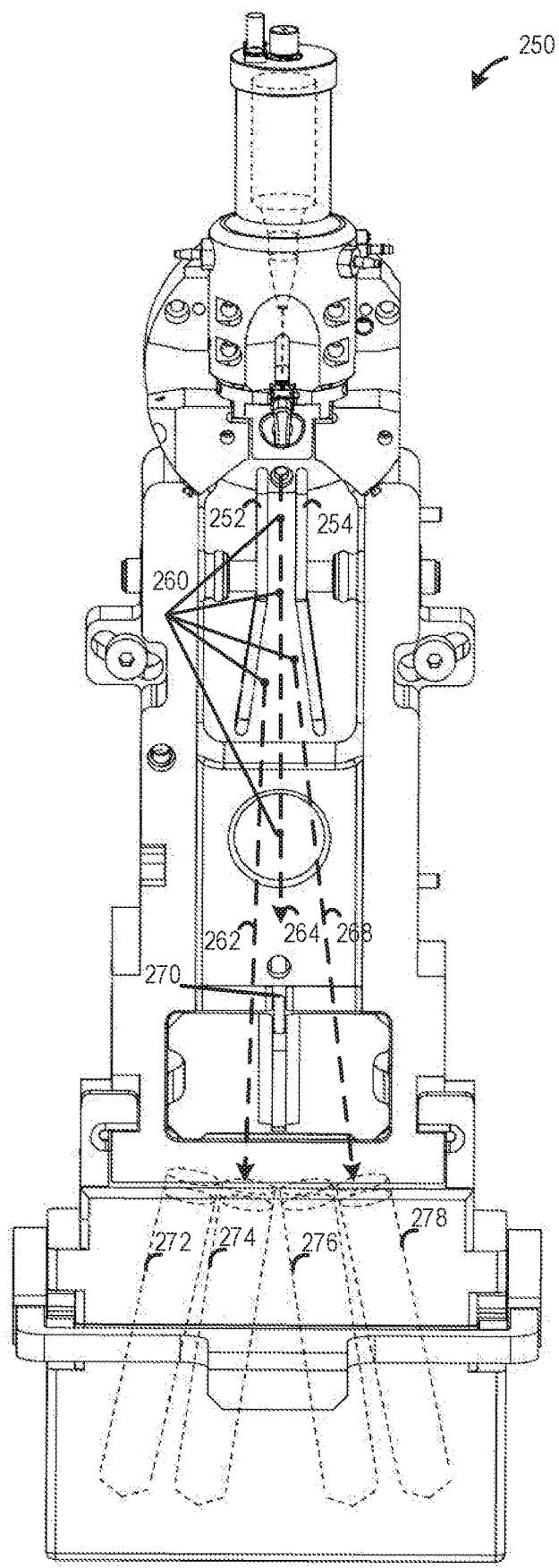
FIG. 2A is a schematic drawing of a particle sorter system, in accordance with one embodiment presented herein.

FIG. 2A is a schematic drawing of a particle sorter system, in accordance with one embodiment presented herein. The particle sorter system 250 shown in FIG. 2A, includes deflection plates 252 and 254. A charge is applied via a stream-charging wire in a barb 256. This creates a stream of particles 260 for analysis. The particles may be illuminated with one or more light sources (e.g., lasers) to generate light scatter and a fluorescence information. The information for a particle is analyzed such as by sorting electronics or other detection system (not shown in FIG. 2A). The deflection plates 252 and 254 may be independently controlled to attract or repel the charged droplet to guide the droplet toward a destination collection receptacle (e.g., one of 272, 274, 276, or 278). As shown in FIG. 2A, the deflection plates may be controlled to direct a particle along a first path 262 toward the receptacle 274 or along a second path 268 toward the receptacle 278. If the particle is not of interest (e.g., does not exhibit scatter or illumination information within a specified sort range), deflection plates may allow the particle to continue along a flow path 264. Such uncharged droplets may pass into a waste receptacle such as via aspirator 270.

The sorting electronics may be included to initiate collection of measurements, receive fluorescence signals for particles, and determine how to adjust the deflection plates to cause sorting of the particles. Example implementations of the embodiment shown in FIG. 2A include the BD FACSAria™ line of flow cytometers commercially provided by Becton, Dickinson and Company of San Jose, Calif.

Figure 2B:
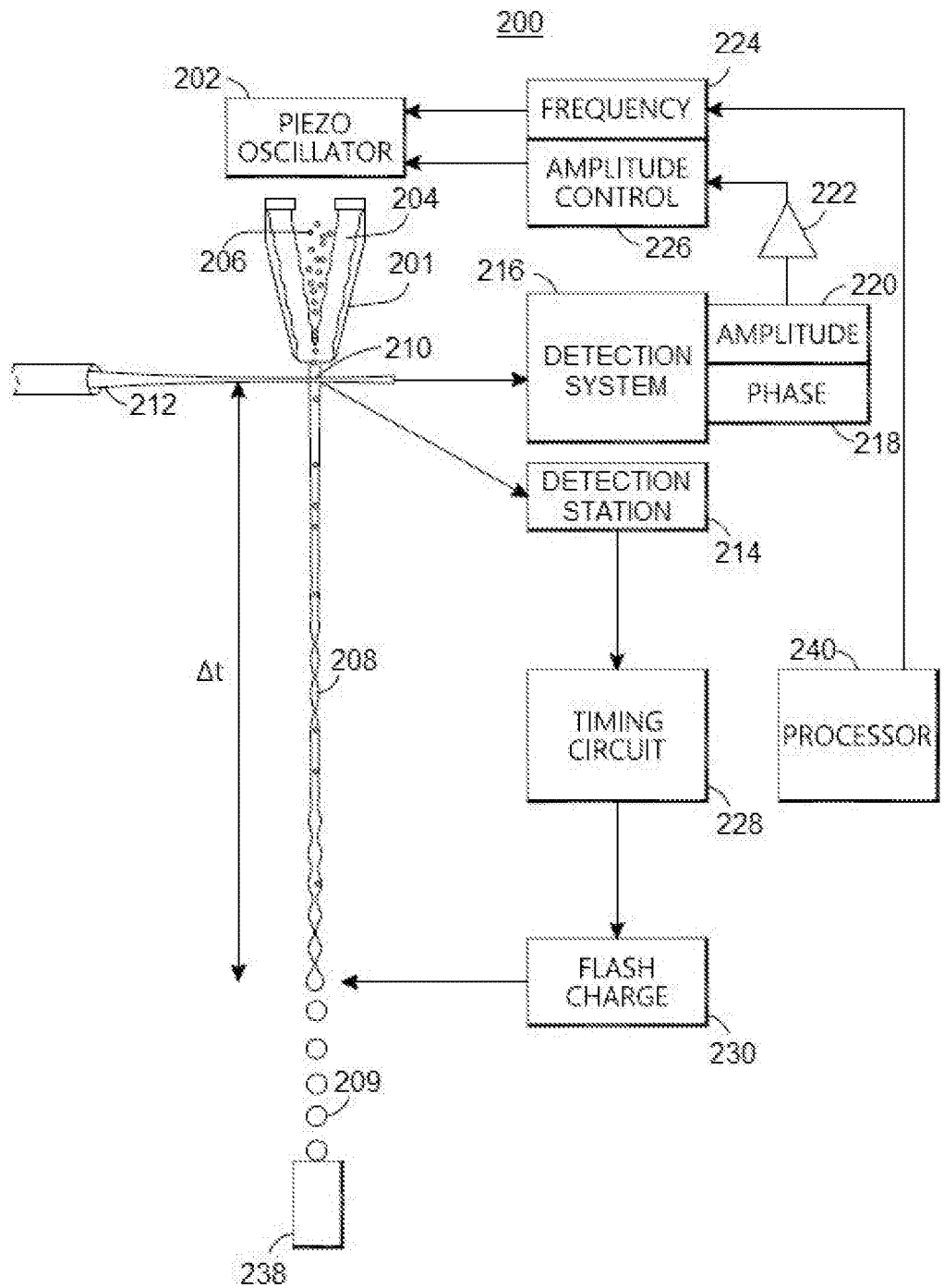
FIG. 2B is a schematic drawing of a particle sorter system 200, in accordance with one embodiment presented herein

FIG. 2B is a schematic drawing of a particle sorter system 200, in accordance with one embodiment presented herein. In some embodiments, the particle sorter system 200 is a cell sorter system. As shown in FIG. 2B, a drop formation transducer 202 (e.g., piezo-oscillator) is coupled to a fluid conduit 201 such as nozzle. Within fluid conduit 201, sheath fluid 204 hydrodynamically focuses a sample fluid 206 into a moving fluid column 208 (e.g. stream). Within the moving fluid column 208, particles (e.g., cells) are lined up in single file to cross a monitored area 210 (e.g., laser-stream intersect), irradiated by an irradiation source 212 (e.g., laser). Vibration of the drop formation transducer 202 causes moving fluid column 208 to break into a plurality of drops 209.

In operation, a detection station 214 (e.g., event detector) identifies when a particle of interest (or cell of interest) crosses monitored area 210. Detection station 214 feeds into timing circuit 228, which in turn feeds into flash charge circuit 230. At a drop break off point, informed by a timed drop delay (Δt), a flash charge is applied to the moving fluid column 208 such that a drop of interest carries a charge. The drop of interest may include one or more particles or cells to be sorted. The charged drop can then be sorted by activating deflection plates (not shown) to deflect the drop into a vessel such as a collection tube or a multi-well sample plate where a well may be associated with drops of particular interest. As shown in FIG. 2B, however, the drops are collected in a drain receptacle 238.

A detection system 216 (e.g. drop boundary detector) serves to automatically determine the phase of a drop drive signal when a particle of interest passes the monitored area 210. An exemplary drop boundary detector is described in U.S. Pat. No. 7,679,039, which is incorporated herein by reference in its entirety. Detection system 216 allows the instrument to accurately calculate the place of each detected particle in a drop. Detection system 216 may feed into an amplitude signal 220 and/or phase 218 signal, which in turn feeds (via amplifier 222) into an amplitude control circuit 226 and/or frequency control circuit 224. Amplitude control circuit 226 and/or frequency control circuit 224, in turn, controls the drop formation transducer 202. The amplitude control circuit 226 and/or frequency control circuit 224 may be included in a control system.

In some implementations, sort electronics (e.g., the detection system 216, the detection station 214 and a processor 240) may be coupled with a memory configured to store the detected events and a sort decision based thereon. The sort decision may be included in the event data for a particle. In some implementations, the detection system 216 and the detection station 214 may be implemented as a single detection unit or communicatively coupled such that an event measurement may be collected by one of the detection system 216 or the detection station 214 and provided to the non-collecting element.

In some embodiments, one or more components described for the particle sorter system 200 may be used to analyze and characterize particles, with or without physically sorting the particles into collection vessels. Likewise, one or more components described below for the particle analysis system 300 (FIG. 3) may be used to analyze and characterize particles, with or without physically sorting the particles into collection vessels. For example, particles may be grouped or displayed in a tree that includes at least three groups as described herein, using one or more of the components of the particle sorter system 200 or particle analysis system 300.

Figure 3:
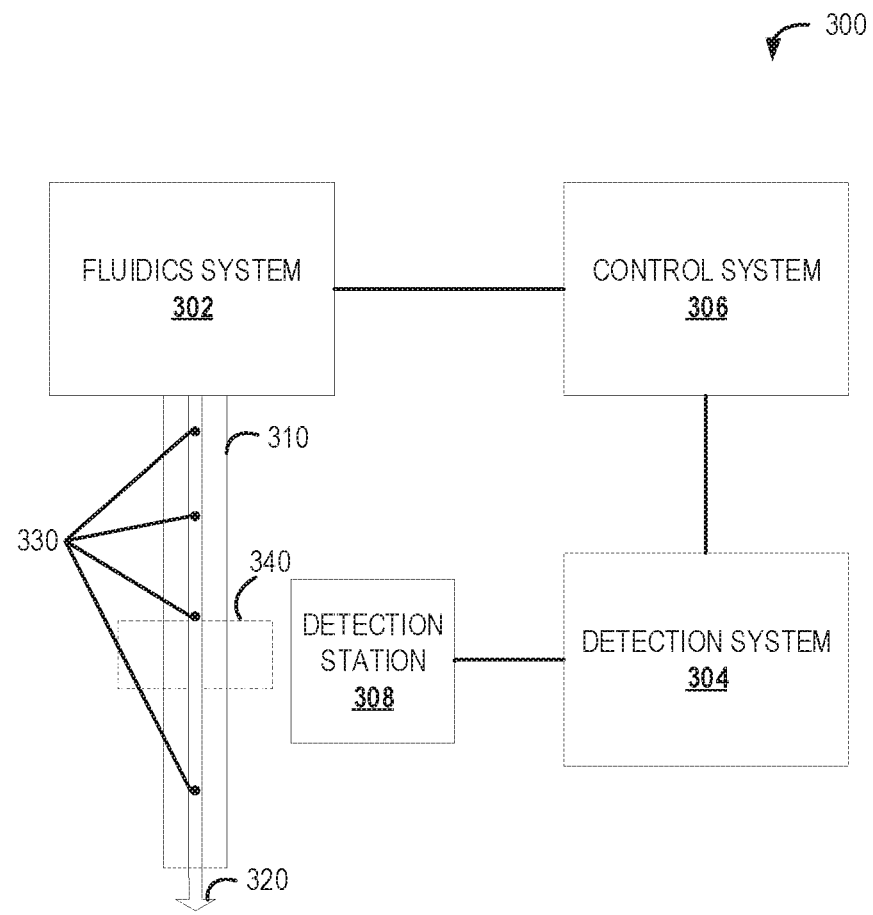
FIG. 3 shows a functional block diagram of a particle analysis system for computational based sample analysis and particle characterization.

FIG. 3 shows a functional block diagram of a particle analysis system for computational based sample analysis and particle characterization. In some embodiments, the particle analysis system 300 is a flow system. The particle analysis system 300 shown in FIG. 3 may be configured to perform, in whole or in part, the methods described herein such as, for example, the method of FIG. 5 or the method of FIG. 8. The particle analysis system 300 includes a fluidics system 302. The fluidics system 302 may include or be coupled with a sample tube 310 and a moving fluid column within the sample tube in which particles 330 (e.g. cells) of a sample move along a common sample path 320.

The particle analysis system 300 includes a detection system 304 configured to collect a signal from each particle as it passes one or more detection stations along the common sample path. A detection station 308 generally refers to a monitored area 340 of the common sample path. Detection may, in some implementations, include detecting light or one or more other properties of the particles 330 as they pass through a monitored area 340. In FIG. 3, one detection station 308 with one monitored area 340 is shown. Some implementations of the particle analysis system 300 may include multiple detection stations. Furthermore, some detection stations may monitor more than one area.

Each signal is assigned a signal value to form a data point for each particle. As described above, this data may be referred to as event data. The data point may be a multidimensional data point including values for respective properties measured for a particle. The detection system 304 is configured to collect a succession of such data points in a first time interval.

The particle analysis system 300 also includes a control system 306. The control system 306 may include one or more processors, an amplitude control circuit 226 and/or a frequency control circuit 224 as shown in FIG. 2B. The control system 306 shown is operationally associated with the fluidics system 302. The control system 306 configured to generate a calculated signal frequency for at least a portion of the first time interval based on a Poisson distribution and the number of data points collected by the detection system 804 during the first time interval. The control system 306 is further configured to generate an experimental signal frequency based on the number of data points in the portion of the first time interval. The control system 306 additionally compares the experimental signal frequency with that of a calculated signal frequency or a predetermined signal frequency.

Figure 4:
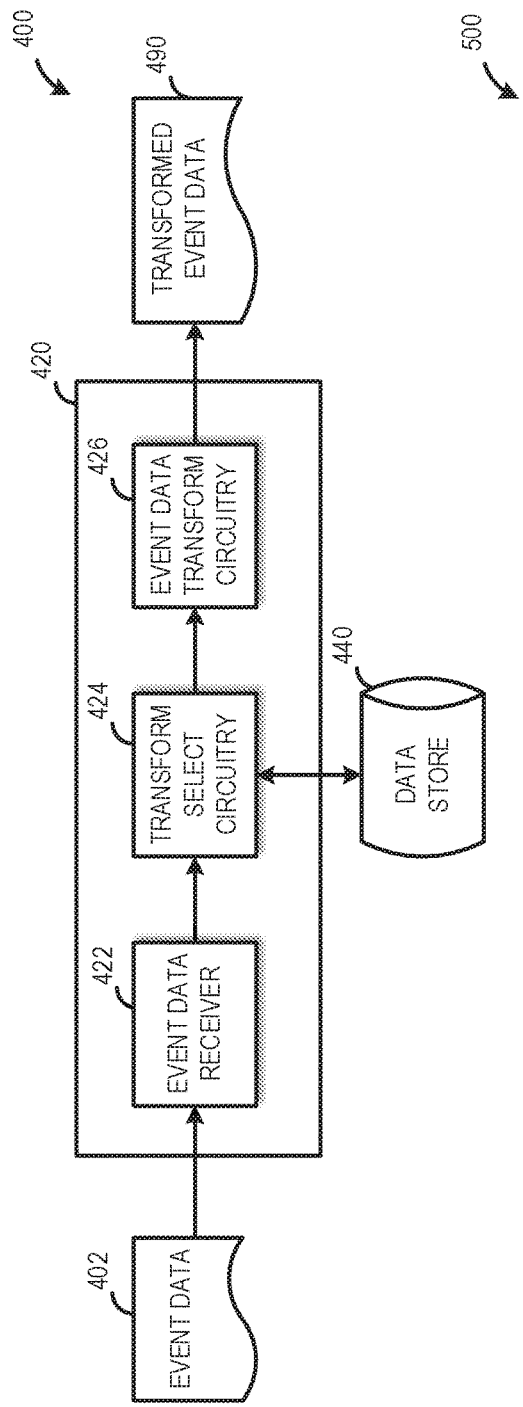
FIG. 4 is a diagram showing an example system to dynamically transform event data.

FIG. 4 is a diagram showing an example system to dynamically transform event data. The system 400 includes a transformation device 420. The transformation device 420 includes an event data receiver 422. The event data receiver 422 may receive event data 402 from a particle analyzer such as the particle analyzer 102 shown in FIG. 1. In some implementations, the event data 402 may be generated by a particle analyzer by received from, for example, an analytics workstation. For example, a user may provide the event data 402 which was obtained from a particle analyzer to the event data receiver 422. The event data receiver 422 may include a transceiver for wireless communication or a port for connecting to a wired network such as an Ethernet local area network or device such as via a Universal Serial Bus or THUNDERBOLT® connection.

The event data receiver 422 may provide at least a portion of the event data 402 to transform select circuitry 424 included in the transformation device 420. The transform select circuitry 424 may identify a transformation to apply for the event data. The identification may include detecting a value in the event data such as an identifier for the assay or experiment. The available transformations may be stored in a data store 440 accessible by the transform select circuitry 424. As discussed, the transformation may be a parametric or non-parametric transformation. In some implementations, the transformation may be specified by a device providing the event data 402. For example, an analysis workstation may submit a message requesting processing of the event data 402. The message may include a desired transformation (e.g., tSNE).

The transformation device 420 may include event data transform circuitry 426 to process the event data 402 according to the identified transformation. The event data transform circuitry 426 may generate transformed event data 490. The transformed event data 490 may be transmitted from the transformation device 420 to a destination device such as the device proving the event data 402, a memory location, or an addressable network service (e.g., laboratory information system).

As discussed above, when performing non-parametric transformations, consistent processing of event data received at different times is unpredictable due to the statistical nature of the transformation. Accordingly, the transformation device 420 in FIG. 4 may provide adequate results when the event data 402 represents measurements for a completed experiment. However, for certain analytical methods, such as establishing sort criteria, a user either makes a best guess as to where populations of interest are expected or obtains measurements for a portion of the samples which can then be used to specify gates. In the first instance, the guesswork can be ineffective in finding true populations of interest and can often require obtaining larger sample sizes which, for some experiments, may be impractical. In the case where an initial portion is analyzed, if the event data is transformed using a non-parametric transform, any resulting gate requires future events to be transformed in the same manner as the initial portion of events. As noted, non-parametric transforms are typically non-deterministic such that event data processed at two different times may provide two different results.

Figure 5:
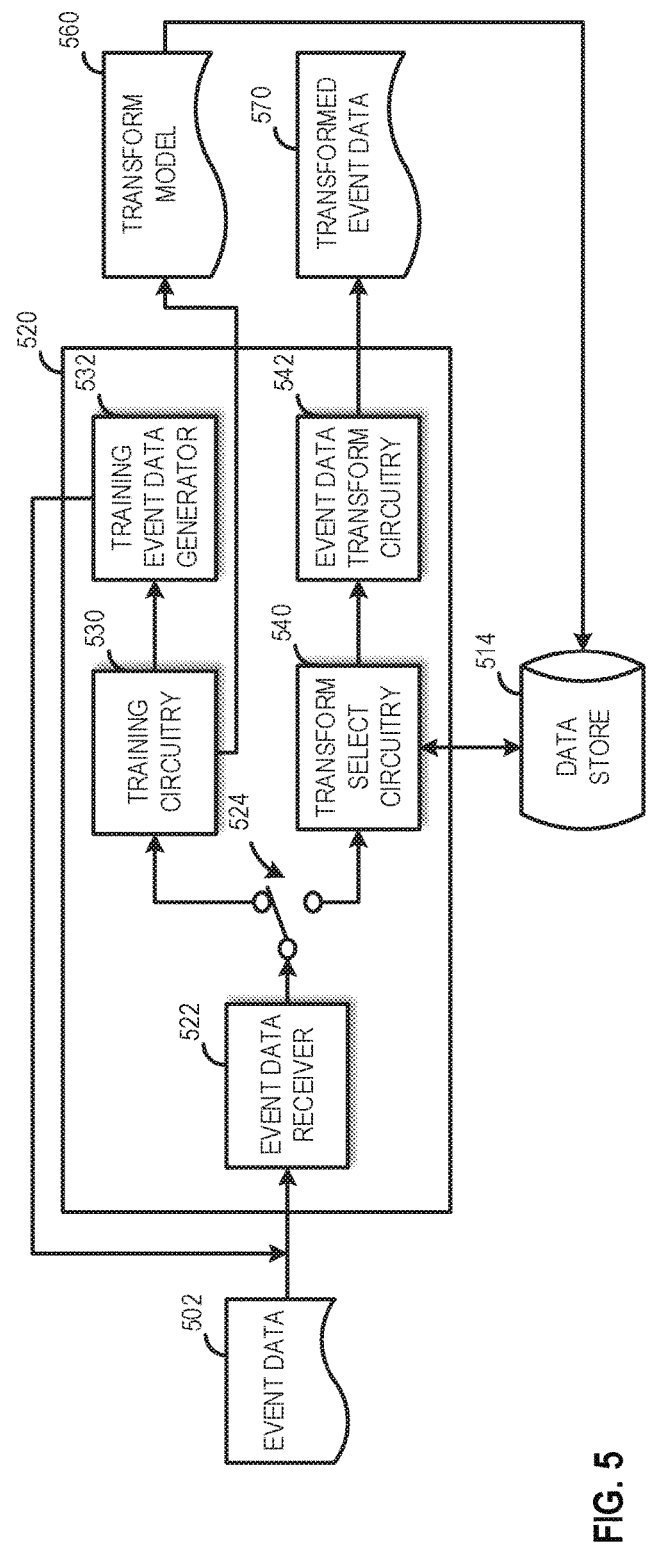
FIG. 5 is a diagram showing an example system to dynamically transform event data using a parametric machine learning transformation.

FIG. 5 is a diagram showing an example system to dynamically transform event data using a parametric machine learning transformation. The transformation device 520 in FIG. 5 includes features to parameterize non-parametric transforms using a neural network thereby allowing a small training dataset to be transformed using non-parametric techniques and used to generate an accurate parametric model for assessing additional events in a manner consistent with the initial events.

The system 500 includes a transformation device 520. The transformation device 520 includes an event data receiver 522. The event data receiver 522 may receive event data 502 from a particle analyzer such as the particle analyzer 102 shown in FIG. 1. In some implementations, the event data 502 may be generated by a particle analyzer by received from, for example, an analytics workstation. For example, a user may provide the event data 502 which was obtained from a particle analyzer to the event data receiver 522. The event data receiver 522 may include a transceiver for wireless communication or a network port for connecting to a wired network such as an Ethernet local area network.

The event data receiver 522 may activate a switch 524 or other routing element for further processing. The switch 524 may branch between transform select circuitry 540 and training circuitry 530. The switch 524 may be activated based on the event data 502, information included in or with the event data 502 such as a message requesting processing of the event data 502, identity of a device providing the event data 502, or other factor detectable by the event data receiver 522 or the switch 524.

When the switch 524 activates the path to the transform select circuitry 540, at least a portion of the event data 502 is provided to the transform select circuitry 540. As with the transform select circuitry 424 in FIG. 4, the transform select circuitry 540 may identify a transformation to apply for the event data. The identification may include detecting a value in the event data such as an identifier for the assay or experiment. The available transformations may be stored in a data store 540 accessible by the transform select circuitry 540. As discussed, the transformation may be a parametric or non-parametric transformation. In some implementations, the transformation may be specified by a device providing the event data 502. For example, an analysis workstation may submit a message requesting processing of the event data 502. The message may include a desired transformation (e.g., tSNE).

The transformation device 520 may include event data transform circuitry 542 to process the event data 502 according to the identified transformation. The event data transform circuitry 542 may generate transformed event data 570. The transformed event data 570 may be transmitted from the transformation device 520 to a destination device such as the device proving the event data 502, a memory location, or an addressable network service (e.g., laboratory information system).

In a second mode, the switch 524 may be activated to route at least a portion of the event data 502 to training circuitry 530. The training circuitry 530 may coordinate the generation of a parametric model for transforming the event data 502. The transformation device 520 may include a training event data generator 532 to generate a suitable training dataset for the machine learning model. The neural network can possess a wide variety of architectures with any number of layers, any number of neurons in a layer and any activation function between connected neurons. However, to facilitate translation of the neural network to a configuration for the sorting electronics included in an analytical instrument, the network training may be constrained to an architecture that can be translated to the target analytical instrument. For instance, the neural network can consist of an entry layer with a number of nodes equivalent to the dimensionality of the untransformed data, four fully connected, rectified linear unit (re-lu) activated layers with 30 nodes each, and an output layer of two nodes with linear activation. Training can be performed using a wide variety of error functions (e.g. mean squared error, Kullback-Leibler divergence) and optimizers (e.g. Adadelta, RMSProp).

After training, the neural network approximates the transformation that was originally used to transform the small training dataset. Thus, the neural network represents a transformation between the space occupied by the original, untransformed data and the space occupied by the transformed data. The neural network can therefore be used to transform new observations by feeding new data to the entry layer and collecting the resulting transformed data from the output layer.

The generated event data may then be transmitted for processing to the transformation device 520. The transformation for the training data may include a non-parametric transformation. The non-parametric transformation may be identified in a request message accompanying or associated with the generated event data. The generated event data may be processed as described above via the event data receiver 522, the transform select circuitry 540, and the event data transform circuitry 542 to generate transformed generated event data.

The transformed generated event data along with the generated event data may then be received from the training circuitry 530 to generate a transform model. Generating the transform model may include generating a neural network that approximates the transformation from the generated event data to the transformed generated event data. As discussed, construction of the model may be constrained based on factors such as target particle analyzer or sort electronics. This can facilitate generation of a transformation model that can be applied to the target particle analyzer or sort electronics. The particle analyzer or sort electronics may indicated using a hardware identifier which may be associated with model architectures or constraints.

The transform model 560 may be stored in the data store 514 and used for subsequent transformation of event data for the experiment or a different experiment.

Figure 6:
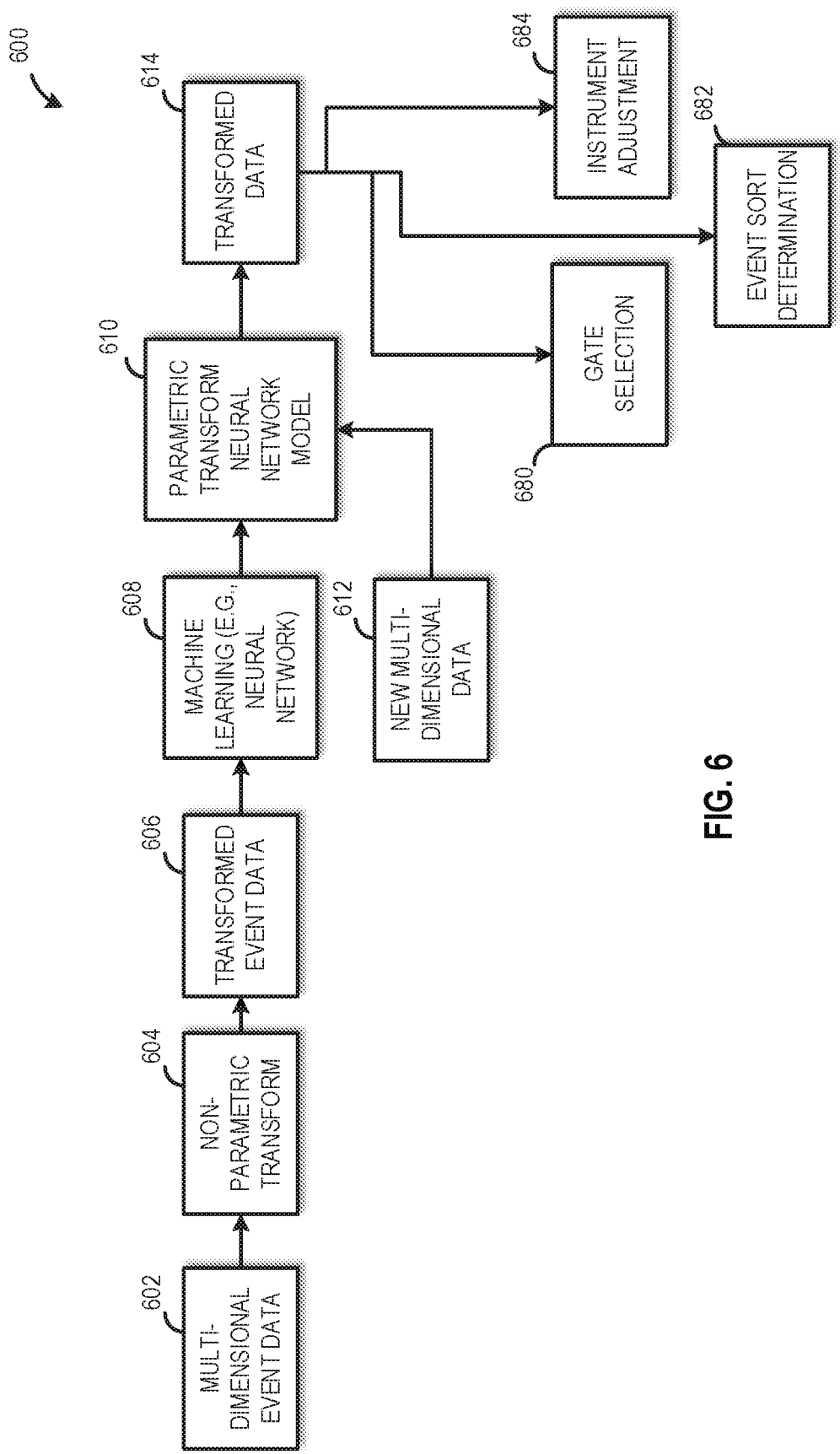
FIG. 6 is a process flow diagram depicting an example of a method of parametric machine learning transformation for multi-dimensional event data.

FIG. 6 is a process flow diagram depicting an example of a method of parametric machine learning transformation for multi-dimensional event data. The method 600 may be implemented in whole or in part by a transformation device, such as the transformation device 520 shown in FIG. 5.

Multi-dimensional event data 602 such as particle analyzer data may be provided. The multi-dimensional event data 602 may be processed using a non-parametric transform 604 such as tSNE to generate transformed event data 606 representing initial transformed measurements for events. The transformed event data 606 may be used to train a model using machine learning 608. The result of the learning may include a parametric transform neural network model 610. This neural network model 610 may generate transformed data 614 for the multi-dimensional event data 602 or new multi-dimensional event data 612. The transformed data 614 may then be provided for additional processing or control such as gate selection 680, event sort determination 682, or instrument adjustment 684 (e.g., pressure regulation for a flow cytometer). Gate selection 680 may include transmitting the transformed event data to a device to present one or more graphical user interfaces. A graphical user interface may include a control element for selecting events of interest and assigning a sorting destination (e.g., vessel, plate, well, cell, tube, etc.) for the events. The selection may include receiving gate information identifying a range of measurements for classifying the particle. The gate may be specified using measurements in the transformed (e.g., non-parametric) space. The gate information may form or be used to generate sorting criterion to configure the particle analyzer to sort the particles for the experiment.

The event sort determination 682 may include transferring the transformation along with sorting criteria to a particle analyzer. The particle analyzer, including the sorting electronics or additional analytical means for processing particles during an experiment, may be configured to transform raw event data and apply the specified sorting criteria. As discussed, the transform may be a parameterized neural network model representing the non-parametric transform used to present the events for gate selection. Instrument adjustment 684 may include transmitting a control signal to the particle analyzer or analytical means included therein to adjust an operational state thereof. For example, flow rate may be adjusted based on a distribution of transformed event data as compared to an ideal distribution. If the distribution deviates from the ideal distribution, the flow rate may be decreased. The amount of decrease may be assessed using the size of the deviation from the ideal distribution. Other operational characteristics of the particle analyzer may be adjusted using the transformed event data such as detector voltages or data scaling factors.

Figure 7:
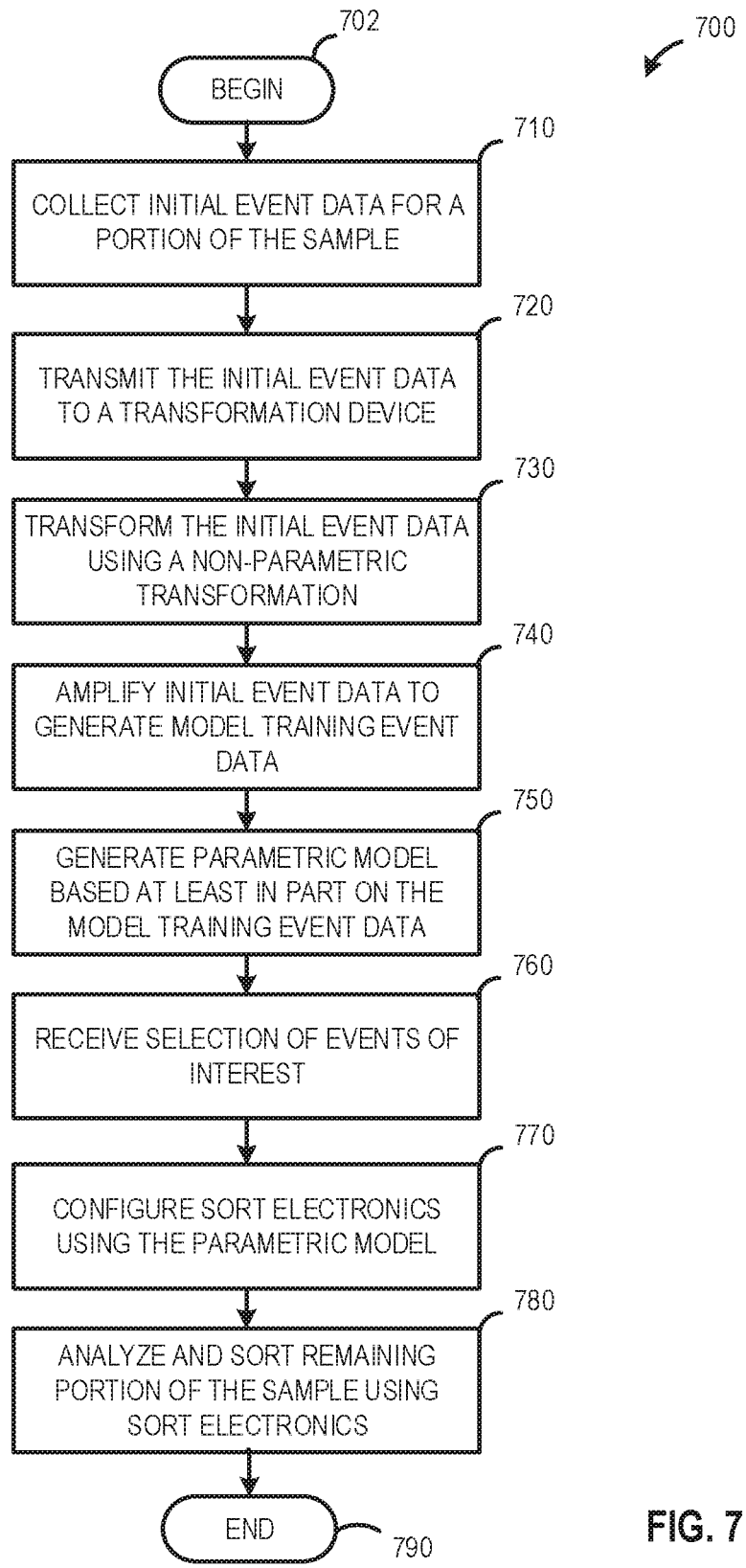
FIG. 7 is a process flow diagram depicting an example of a method of sample sorting using parametric machine learning transformation.

FIG. 7 is a process flow diagram depicting an example of a method of sample sorting using parametric machine learning transformation. The method 700 may be implemented in whole or in part by the devices shown in FIG. 1. Aspects of the method 700 may be coordinated using a management device such as the transformation device 520 shown in FIG. 5. The method 700 illustrates how event data can be processed to generate a parametric transformation based on non-parametric transformation of an initial set of events.

The method 700 begins at block 702. At block 710, initial event data for a portion of a sample is collected. The collection may include activating a particle analyzer to process the portion of the sample. Processing the sample may include measuring a property of particles such as graphic, electrical, temporal, or acoustic properties.

At block 720, the initial event data may be transmitted to a transformation device such as the transformation device 520 shown in FIG. 5. The transmission may include transmitting a message requesting transformation of the initial event data. The message may include an identifier for an experiment, sample, sample source, or other unique information to identify the event data. The identifier may be used to select a transformation for the event data. The identifier may be used to associate a parametric transformation generated from the event data with subsequent requests for transformations.

At block 730, the initial event data is transformed using a non-parametric transformation. The transformation may be selected from a set of transformations based on, for example, the event data. For example, if the event data includes acoustic measurements, a tSNE transformation tailored for acoustic values may be used. In some implementations, the transformation may be specified in the message requesting processing of the event data. For example, if a researcher requests a plot of the event data for gating, the request may include an indication of the type of transformation to apply such that the dimensionality of the event data can be graphically represented for gating.

At block 740, the initial event data may be amplified to generate model training event data. The amplification may include generating training data based on measurements for the events. For example, a measurement may be used to generate a second synthetic event within a threshold distance from the measurement. The synthetic measurement may include a measurement pair wherein one value is a synthetic un-transformed measurement and the second value is a synthetic transformed measurement. Table 1 shows event data for a measurement using a 0.001 threshold (e.g., a synthetic measurement based on an actual measurement should within 0.001 of the actual measurement).

TABLE 1

| Event Id | Synthetic? | Measurement |
|---|---|---|
| 1 | No | 2.30495 |
| 2 | Yes | 2.30492 |
| 3 | Yes | 2.30499 |
| 4 | Yes | 2.30404 |

The threshold may be based on the type of measurement. For example, optical measurements (e.g., fluorescence based values) may be more tolerant than image based measurements. The thresholds may be specified in a configuration accessible to the device performing the training. Aspects of the generation of transformation data are included in FIG. 5 and FIG. 6 above.

At block 750, the parametric model is generated based at least in part on the model training event data. Generating the parametric model may include training a neural network model that approximates the non-parametric transformation from the actual and synthetic event data to transformed event data. Generating the parametric model may include generating a neural network that approximates the transformation from the generated event data to the transformed generated event data. As discussed, construction of the model may be constrained based on factors such as target particle analyzer or sort electronics. This can facilitate generation of a transformation model that can be applied to the target particle analyzer or sort electronics.

At block 760, a selection of events of interest may be received. For example, the researcher may draw a polygon on a graph to define a range of transformed data values to be sorted. The polygon may define a gate which can be or be associated with a sort criteria. The selection may be made using the initial event data transformed either by the non-parametric transformation or as transformed by the parametric model.

At block 770, sort electronics (e.g., sorting circuitry) may be configured using the parametric model and the gating criteria specified at block 760. The configuration of the sort electronics may include storing the model generated at block 750 in a memory location accessible to the sort electronics. The model may then be used to transform received event data for assessment against sorting criteria such as the populations identified at block 760. As discussed, the model may be used to configure a field programmable gate array included in the sort electronics.

At block 780, the analyzer may assess and sort the remaining portion(s) of the sample using the configured sort electronics. As a new event measurement is collected, the measurement may be transformed, in real time, using the configured sort electronics and sorted to the specified vessel. For example, the deflection plates of the particle analyzer may be activated to direct a particle of interest into a specified collection tube.

The method 700 may end at block 790. However, it will be appreciated that the method 700 may be repeated for additional events, samples, or experiments. In some implementations, it may be desirable to retrain the model to adapt to any variations within the sample or to account for a change in the sample source. For example, in a therapeutic environment, a biological sample may be collected during administration of a drug or other compound. The model may need adjusting to account for the presence of the drug or compound once administered. In such instances, the model may be retrained data collected since the original model was trained. This may provide improved resource utilization as compared with training a new model using the corpus of event data collected from the sample.

The features described may sort particles based on their membership to a target cluster. Mahalanobis distance may be used to measure a particle's distance to known clusters. The sort decision for particles may be based on which cluster the particle is closest to. For some samples, particles close to a contaminating cluster may be excluded or diverted to an alternate collection vessel. The criteria for determining closeness may be based on minimal probability of error. The probability may be defined using a configuration or specified as part of the experimental set up for a sample. Known clusters may be identified by training sets. A training set may include a subset of measurements of particles belonging to a cluster. The mean and covariance of a training set may be generated as a metric representation of a cluster. This metric may then serve as a factor in the Mahalanobis distance equation which may be evaluated using hardware capable of analyzing a measurement to generate a sort decision in time to direct a particle to a particular collection vessel.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields, buttons, or other interactive controls for receiving input signals or providing electronic information or for providing information to the user in response to any received input signals. A UI may be implemented in whole or in part using technologies such as hyper-text mark-up language (HTML), JAVASCRIPT™, FLASH™, JAVA™, .NET™, WINDOWS OS™ macOS™, web services, or rich site summary (RSS).

In some implementations, a UI may be included in a stand-alone client (for example, thick client, fat client) configured to communicate (e.g., send or receive data) in accordance with one or more of the aspects described.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed transformation processor, which may include one or more processors, such as one or more digital signal processors (DSPs), configurable microprocessors, an application specific integrated circuits (ASICs), field programmable gate arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. In some aspects, the functionality described herein may be provided within dedicated software modules or hardware modules configured for encoding and decoding, or incorporated in a specialized transformation control card.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Various embodiments of the invention have been described. These and other embodiments are within the scope of the following claims.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method comprising:
introducing a sample into a flow cytometer;
flowing the introduced sample in a flow stream;
irradiating the sample in the flow stream with a light source;
detecting light from particles in the sample flowing in the flow stream;
collecting a first raw data set based on light detected from particles in the sample flowing in the flow stream;
applying a non-parametric transformation to the first raw data set from the flow cytometer to generate a first transformed data set;
generating a second transformed data set from the first transformed data set;
generating a transformation model using the second transformed data set; and
collecting a second raw data set based on light detected from particles in the sample flowing in the flow stream;
applying the transformation model to the second raw data set from the flow cytometer;
classifying particles based at least in part on results of applying the transformation model; and
configuring the flow cytometer to sort particles based at least in part on results of particle classification.

2. The method according to claim 1, wherein the non-parametric transformation comprises t-distributed stochastic neighbor embedding (tSNE).

3. The method according to claim 1, wherein the first raw data set comprises data from 10,000 detected cells or less from the flow cytometer.

4. The method according to claim 1, wherein generating the second transformed data set comprises adding a noise component.

5. The method according to claim 4, wherein generating the second transformed data set comprises adding the noise component to one or more of the first raw data set, the first transformed data set and a combination thereof.

6. The method according to claim 5, wherein generating the second transformed data set comprises adding the noise component to a data pair that comprises a raw data point and transformed data point.

7. The method according to claim 6, wherein the raw data point and the transformed data point are selected by random selection.

8. The method according to claim 7, wherein the raw data point and the transformed data point are selected by a weighted random selection.

9. The method according to claim 8, wherein the random selection is weighted by one or more of density and cell population.

10. The method according to claim 4, wherein the noise component is based on a probability distribution.

11. The method according to claim 10, wherein the probability distribution is selected from the group consisting of uniform, Gaussian and Poisson.

12. The method according to claim 1, wherein the transformation model is a dynamic algorithm.

13. The method according to claim 12, wherein the dynamic algorithm is a machine learning algorithm.

14. The method according to claim 1, wherein the transformation model is applied to data from the flow cytometer in real time.

15. The method according to claim 1, wherein the method is performed by an integrated circuit device selected from the group consisting of a field programmable gate array (FPGA), an application specific integrated circuit (ASIC) and a complex programmable logic device (CPLD).

16. The method according to claim 1, wherein the non-parametric transformation comprises a dimensionality reduction algorithm.

17. The method according to claim 1, wherein the transformation model comprises a dimensionality reduction model.

18. A system comprising:
one or more processing devices; and
a computer-readable storage medium comprising instructions that, when executed by the one or more processing devices, causes the system to,
receive, from a particle analyzer, measurements for a first portion of particles associated with an experiment;
convert the measurements using a non-parametric transformation into initial transformed measurements;
generate a parametric model to receive as an input raw measurements for the first portion of particles associated with the experiment and generate as an output the initial transformed measurements;
configure the particle analyzer to:
convert a measurement for a particle included in a second portion of the particles based at least in part on the parametric model;
generate a control signal to adjust an operational state of an analytical means included in the particle analyzer; and
transmit the control signal to the analytical means to achieve the operational state.

19. The system according to claim 18, wherein the analytical means comprises sorting electronics.

20. The system according to claim 18, wherein the analytical means comprises a fluidics system.

21. An integrated circuit programmed to:
collect a first raw data set based on light detected from irradiating particles in a sample flowing in a flow stream of a flow cytometer;
apply a non-parametric transformation to the first raw data set from the flow cytometer to generate a first transformed data set;
generate a second transformed data set from the first transformed data set;
generate a transformation model using the second transformed data set;
collect a second raw data set based on light detected from irradiating particles in the sample flowing in the flow stream of the flow cytometer;
apply the transformation model to the second raw data set from the flow cytometer;
classify particles based at least in part on results of applying the transformation model;
generating a sort decision to sort particles based at least in part on results of particle classification; and
transmitting the sort decision to the flow cytometer.

* * * * *